May 12, 1959
H. H. CAMPBELL
2,885,962
FUEL PUMP
Filed March 8, 1956
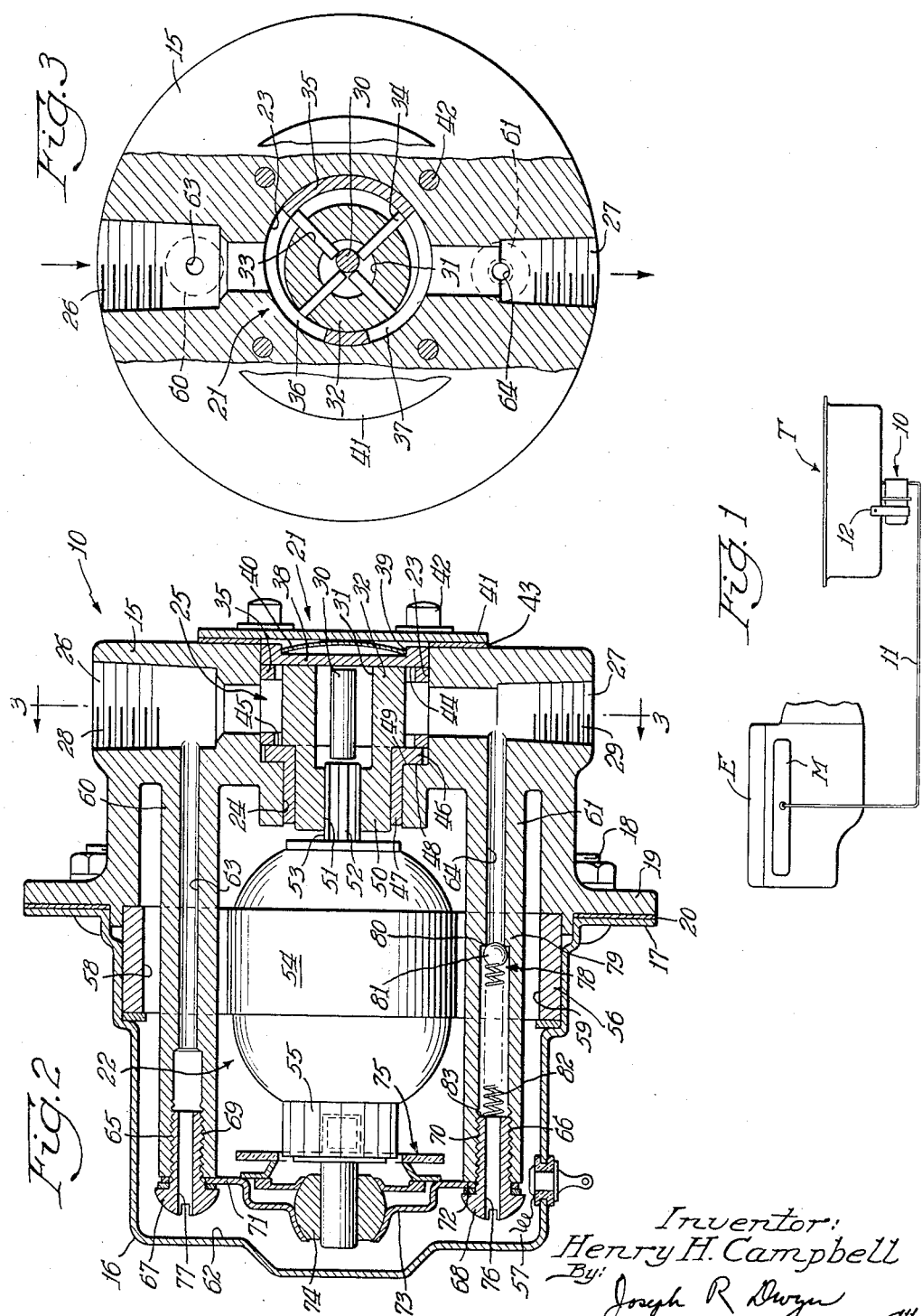
Inventor:
Henry H. Campbell
By: Joseph R. Dwyer
Atty.

United States Patent Office 2,885,962
Patented May 12, 1959

2,885,962

FUEL PUMP

Henry H. Campbell, East Cleveland, Ohio, assignor to Borg-Warner Corporation, Chicago, Ill., a corporation of Illinois Application March 8, 1956, Serial No. 570,350

3 Claims. (Cl. 103—42)

This invention relates in general to fuel pumps and is particularly concerned with a fuel booster pump adapted to be located adjacent the fuel tank of an automotive vehicle to boost the fuel under pressure from the fuel tank to the vehicle engine.

With the advent of increased horse power in automobiles and particularly with the incorporation of fuel injection systems therein, it has become necessary that the amount of fuel transported from the fuel tank to the vehicle engine, and/or the fuel injection system for the vehicle engine, be increased. It has been found also that the present manner of drawing the fuel from the fuel tank by means of a pump located adjacent the vehicle engine does not suffice the fuel injection system and the fuel pump and/or the fuel injector was starving at the inlet. This starvation, of course, is similarly true in vehicles using the present day carburetion systems and my invention will apply equally well to these systems. Accordingly, my invention seeks to overcome the difficulties encountered by the increased consumption in fuel in automotive engines by providing an arrangement whereby additional fuel is transported under pressure from the immediate vicinity of the fuel tank to the fuel injection system. In this manner, not only is sufficient fuel under pressure transported with the fuel pump located where there is no danger of any starving of its inlet but at the same time the fuel pressure is maintained at an adequately high level at the inlet of the injection system so that the latter has sufficient fuel regardless of the fuel being consumed at the time.

Accordingly, it is a general object of my invention to provide a new and improved fuel system for an automotive vehicle which overcomes the limitations of the present-day systems of transporting fuel from the fuel tank to the vehicle engine.

A more specific object of my invention is to provide a new and improved fuel booster pump for use in an automotive vehicle which will transport fuel under pressure to the fuel consuming means located near the vehicle engine.

Still another object of my invention is to provide a new and improved fuel booster pump located adjacent the fuel tank of the automotive vehicle which will discharge and cause fuel to be transported under pressure to the fuel injection system of an automotive vehicle.

I propose to accomplish the above objects by providing a new and improved electrically operated booster pump, located near or adjacent the fuel tank, preferably immediately beneath the same, and which will pump fuel which it receives from the vehicle tank and discharge the same under pressure so that it can be transported to the fuel consuming means in the automobile. This booster pump is provided with a relief valve which limits the pressure of the fuel discharged from the outlet of the pump so as not to exceed the amount required by the automotive engine at any time. My pump has too another important feature, namely the entire electric motor assembly including the commutator assembly as well as the pumping mechanism itself is completely submerged in fuel from the vehicle tank whereby the electric motor assembly and all other parts are lubricated by the fuel, thus eliminating any additional lubricating means for the life of the booster pump assembly. This latter feature, it has been found, also greatly increases the life of parts of my pump, such as the brushes in the commutator.

Therefore, still another object of my invention is to provide a new and improved electrically driven booster pump located near the fuel tank for transporting fuel under pressure to the automotive engine.

Still another and more specific object of my invention is to provide a new and improved fuel booster pump capable of being operated completely submerged in fuel whereby the electric motor assembly and the fuel pump assembly is completely submerged in fuel at all times.

Other and more specific objects, features and advantages of my invention will become apparent from the following detailed description and drawings, in which:

Figure 1 is a schematic drawing showing my booster pump preferably located beneath the fuel tank of an automotive vehicle and showing the means of transporting fuel to a conventional manifold of an automotive vehicle;

Figure 2 is an elevational, sectional view showing to advantage the booster pump constructed in accordance with the present teachings of my invention; and Figure 3 is a cross-sectional view, partially broken away, taken along line 3—3 of Figure 2 and showing to advantage the pump assembly constructed in accordance with the teachings of my invention.

Referring now to the drawings and particularly Figure 1 thereof there is shown a conventional fuel tank T of the usual type located at the rear of an automobile having my fuel booster pump, indicated in its entirety by numeral 10, affixed adjacent the bottom of the tank and placed in fluid communication therewith and with the manifold M of the automobile vehicle engine E in the usual manner by hydraulic conduit or fuel line 11. As will be seen from a more detailed description hereinafter, fuel entering the inlet of my booster pump is discharged under pressure through the fuel line 11 to the manifold and/or fuel injection system of the vehicle engine E. It is preferred that my booster pump 10 be located externally beneath the tank and in position to be gravity-fed with fuel from the tank T. Suitable means may be provided for affixing the booster pump in this position, including, for example, the strapping 12 as shown in Figure 1 connecting my pump directly to the tank. Obviously, other means may be provided, strapping 12 being merely exemplary.

Referring now particularly to Figures 2 and 3, it can be seen that my booster pump 10 comprises a housing or base 15 and a cup-like cover member 16 with outwardly extending flange 17 suitably affixed in a sealed relationship by bolt-like members 18 to outwardly extending flange 19 formed on the base 15. Suitable gasket means 20 is interposed between the flange 17 of the cover member 16 and the flange 19 of the base 15 to provide a suitable sealing relationship. Disposed within the base 15, centrally thereof, is my fuel pump, indicated in its entirety as 21, drivingly connected to an electric motor assembly, indicated in its entirety as, 22 disposed centrally within the base 15 and cover 16. Base 15 is bored or formed centrally thereof with a housing cavity 23 having its axis located eccentrically with the center of the base and axis of rotation of my pump assembly and which terminates inwardly in a smaller bore or cavity 24, having its axis concentric with the axis of the pump assembly. Disposed within the cavity 23 is pump impeller assembly, indicated in its entirety as 25. Inlet 26 and outlet 27 are provided in the base 15 whereby fuel entering the pump assembly 21 is discharged, upon rotation of the impeller 25 by the electric motor assembly 22, under pressure out of the outlet 27 and ultimately to the automotive engine E. Inlet 26 may be internally threaded as indicated at 28 to be suitably attached to an externally threaded fixture which ultimately will connect the inlet 26 with the tank T as shown in Figure 1. Similarly outlet 27 may be internally threaded as at 29 to be suitably attached to an externally threaded fixture whereby line 11, shown in Figure 1, may be attached thereto.

Impeller assembly 25 comprises a centrally located axially disposed pin member 30 received in an axially centrally disposed bore 31 formed in a rotatable ring-like rotor means 32. The diameter of the bore 31 is large in comparison with the outer diameter of the pin member 30 so that the pin is free to move within the bore 31 during rotation of the rotor means 32. Rotor 32 is provided with radially extending slots 33 in which are disposed reciprocating vane members 34 which contact the eccentrically disposed race of ring member 35, the latter of which is disposed in contact with the eccentrically formed housing cavity 23. Upon rotation of the impeller by the electric motor assembly 22, vanes 34 reciprocate in their respective slots 33. The outer ends of the vanes are in contact with the eccentrically disposed race 35 and the radially inner ends of the vanes are in contact with the centrally located pin member 30 and the coaction of the vanes with the pin member 30 and the eccentrically disposed race 35, upon rotation of the rotor 32, provides the pumping action of my pump assembly 21. Ring-like member 35 is provided with an inlet opening 36 and an outlet opening 37 whereby fluid is introduced into the pumping cavity and discharged under pressure by operation of the sliding vanes and rotor aforesaid.

Turning now to Figure 2 there is shown an end plate member 38 disposed within the cavity 23 and having a flange-like means 39 extending outwardly from the cavity 23, or to the left as shown in the drawing, against which is disposed a resilient spring member 40 having an end portion resting against the flange 39 and the center portion thereof compressed against an outer plate-like member 41, the latter being held in place by a plurality of bolt means 42. A suitable gasket 43 is interposed between the base 15 and the outer-place-like member 41 to provide a sealing relationship. The combination of the end plate member 38, spring member 40 and outer plate member 41 are so disposed and arranged to hold the entire impeller assembly in the housing cavity 23 during the pumping operation with the inner portion or wall 44 of the end plate member 38 providing one inner wall of the pumping chamber. At the opposite end of the housing cavity 23 from the inner wall 44 there is also provided a second pumping chamber wall 45 facing inner wall 44 and formed on the one face or terminal end of the flange 46 of the bushing or bearing means 47. The other or outer wall 48 of the flange 46, opposite wall 45, rests against wall 49 formed in the base 15, as a step-like portion, between housing cavities 23 and 24 whereby the coaction of the end plate member 38 and spring 40 maintains the entire impeller assembly against the wall 49. It is to be noted that ring member 35 has an axial thickness less than the depth of the housing cavity 23 whereby the end plate member 38 and its flange 39 are entirely disposed within housing cavity 23 to form a pumping assembly. Rotor 32 is formed at one end (the right end as viewed in the drawing) of the same thickness as the ring or vane member 35 so as to be disposed against the wall 44 on one side and the wall 45 on the other side. An axial extension 50 is provided on the rotor 32 of less radial dimension than the radial dimension of the rotor itself disposed in the pumping chamber. This extension 50 is axially centrally bored and provided with internal splines 51 which are drivingly connected by external splines 52 formed on the one end of the shaft 53 of the electric motor 22. Extension 50 is journaled in bearing means 47 for proper support, etc.

Turning now to the electric motor assembly 22 as shown in Figure 2, there is provided on the shaft 53 an armature assembly 54 electrically coupled to a commutator assembly 55 which rotates out the shaft 53 within stator assembly 56, all of which are located within the cover member 16. Commutator assembly 55 is electrically connected to a suitable source of electric power, such as a battery and/or a generator by electrical conduit means 57. Obviously, upon being provided with sufficient electrical power, the armature assembly 54 rotates within the stator assembly 56 to drive the pump assembly 21.

Stator assembly 56 is further provided with a pair of holes or apertures 58 and 59 through which is extended a pair of pencil-like extensions 60 and 61 formed integrally with the base 15, in the embodiment shown. Since the stator is relatively thin, finger-like extensions 60 and 61 extend therethrough and further extend substantially from the base 15 to the inner end portion 62 of the cover 16. Finger-like extensions 60 and 61 also are centrally bored throughout their respective entire lengths to provide passages 63 and 64 which respectively communicate at one end with the inlet 26 and outlet 27 and at the other end with the internal portion of the cover 16. Extensions 60 and 61 are each additionally counterbored and threaded internally as shown at 65 and 66 to receive in threaded relationship bolt means 67 and 68 each having external threads 69 and 70 respectively cooperating therewith. Interposed between the terminal end portions 71 of extension 60, the terminal end portion 72 of extension 61 and their respectively associated bolt means 67 and 68 is an apertured bearing supporting plate 73 suitably formed to retain bearing means 74 centrally thereof. One end of shaft 53 is journalled for rotation in bearing means 74 while the other end of shaft 53 is journalled in bearing means 47. Commutator assembly 55 is further provided with a suitable commutator retaining means indicated in its entirety as 75 which properly retains the bearing means 74 and the commutator assembly 55 in proper relationship to each other for proper performance. Since this type of assembly is generally well known, no further discussion of any features thereof is deemed necessary.

To provide fluid communication between the passage 64 of extension 61 connecting with the outlet 27 and the interior of the cover 16 bolt means 68 is formed with an axial bore or aperture 76. Similarly, to provide fluid communication between the passage 63 of extension 60, connecting with the inlet 26 and the interior of the cover 16, bolt means 67 is provided with an axial bore or aperture 77. It can be seen that, with the passage 63 in communication with the inlet 26, the entire internal electric motor assembly 22 and pump assembly 21 enclosed within the base 15 and the covering 16 are continuously submerged in the fuel being pumped. It is important to note, however, that while the fuel is free to enter the interior of my pump assembly through passage 63, the size of the passage 77 in the bolt means 76 can be carefully selected so as to prevent explosive gases from returning to the tank through the inlet 26 in the event a spark from the electric motor assembly or pump assembly were to ignite any fuel vapors which may exist within the interior of the housing and cover during any period of operation or non-operation of my pump.

In the embodiment shown, passage 64 of extension 61 is enlarged slightly intermediate the ends of extension 61 and there is provided in this enlargement a one-way valve assembly, indicated in its entirety as 78. The terminal end portion 79 of the enlargement provides a valve seat 80 for ball poppet 81 urged thereagainst by coil spring means 82; the latter having one end disposed the ball poppet 81 and the other end against terminal end portion 83 of the bolt means 68. Obviously, the selection of the compressibility of the spring 62 will regulate the maximum pressure of fuel in outlet 27, the excess of which will react to remove ball poppet 81 from its seat 80. Any such excess of pressure will cause fluid to flow through passage 64, one-way valve assembly 78, aperture 76, into the interior of cover 16 and into aperture 77 of bolt means 67, into passage 63, back to inlet.

Thus, I have described a fuel booster pump which will suitably perform the function required of it and which is economical to manufacture and suitable for present and future automotive use. In operation, fuel entering the inlet 26 is discharged through outlet 27 under pressure by the combined operation of the electric motor assembly 22 and pump assembly 21. Inlet 26, in the embodiment shown, is in fluid communication with tank T and pump outlet 27 is in fluid communication with fuel line 11 so that fuel under pressure is transported by operation of my booster pump from the tank T of the automotive vehicle to the engine E, usually located remote from the tank. Any pressure built up by the pump assembly 21 in excess of that required by the engine E at any time is returned to the inlet 26 by operation of the one-way valve assembly 78 acting as a pressure relief valve.

As previously stated, one outstanding feature of my present invention is that it requires no additional lubrication since all internal parts are so constructed and arranged that the same operates submerged in the fuel being pumped, and while I have shown my pump assembly located beneath the tank T so that the axis of rotation of the electric motor is disposed horizontally I prefer to dispose the assembly so that the pump parts are located above the electric motor parts whereby the electric motor parts are sure to be continually submerged in fuel. Therefore, no additional lubrication is needed and it has been found that this arrangement prolongs the life of many parts which would normally wear out rapidly. In addition, I wish to point out that by submerging all rotating parts in a sealed unit, no rotating seal is required, thus reducing leakage and possible loss of fuel. Incidentally, by locating my pump assembly adjacent the tank, vapor lock at high altitudes or during hot weather is eliminated. I have also provided an expeditious means of reducing the danger of fire and explosion by preventing explosive gases from entering the tank by the provision of the explosive resistant orifice or flame arrestor in the only communication between the internal parts of my booster assembly and the inlet connection of the assembly to the tank.

Wherein the various parts of my invention have been referred to as located in a right or left position, or in an upper or lower position, it will be understood that this is done solely for the purpose of facilitating description and that such references relate only to the relative position of such parts as shown in the accompanying drawings, and while one preferred embodiment of my invention has been specifically disclosed it will be understood that my invention is not so limited, and my invention is to be given its broadest possible interpretation within the terms of the following claims.

I claim:

1. A fuel booster pump adapted to be mounted horizontally and having a base means and a cover means, said base means and said cover means forming a chamber; said base means having an inlet and an outlet and provided with a pumping cavity, said inlet being disposed above said outlet when said pump is horizontally mounted; an impeller disposed within said cavity; a plurality of finger-like extensions formed on said base means and extending into said chamber, a motor assembly disposed within said chamber and having a rotor supported by said finger-like extensions and drivingly connected to said impeller whereby fuel entering said inlet is discharged under pressure out said outlet upon rotation of said impeller by said motor assembly, said rotor having a horizontal axis of rotation when said pump is horizontally mounted; means defining a first passage means in one of said extensions for fluidly interconnecting said inlet with said chamber to provide a supply of fuel within said chamber, the level of said supply of fuel extending to at least the height of said one extension whereby said rotor is submerged in fuel, said first passage means providing said pump with explosive resistance to prevent fire which may occur in said motor assembly from reaching fuel in said inlet; means defining a second passage means in another of said extensions for fluidly interconnecting said outlet with said chamber; means disposed in said second passage means preventing fluid from said outlet from entering said chamber through said second passage means until said fluid reaches a predetermined pressure value to thereby prevent the value of said pressure fluid in said outlet from exceeding said predetermined pressure value.

2. A fuel booster pump adapted to be mounted horizontally and having a base means and a cover means, said base means and said cover means forming a chamber; said base means having an inlet and an outlet and provided with a pumping cavity, said inlet being disposed above said outlet when said pump is horizontally mounted; an impeller disposed within said cavity; a plurality of finger-like extensions formed on said base means and extending into said chamber, a motor assembly disposed within said chamber and having a rotor supported by said finger-like extensions and drivingly connected to said impeller whereby fuel entering said inlet is discharged under pressure out said outlet upon rotation of said impeller by said motor assembly, said rotor having a horizontal axis of rotation when said pump is horizontally mounted; means defining a first passage means in one of said extensions for fluidly interconnecting said inlet with said chamber to provide a supply of fuel within said chamber, the level of said supply of fuel extending to at least the height of said one extension whereby said rotor is submerged in fuel, said first passage means having a restriction formed therein providing said pump with explosive resistance to prevent fire which may occur in said motor assembly from reaching fuel in said inlet; means defining a second passage means in another of said extensions for fluidly interconnecting said outlet with said chamber; means disposed in said second passage means preventing fluid from said outlet from entering said chamber through said second passage means until said fluid reaches a predetermined pressure value to thereby prevent the value of said pressure fluid in said outlet from exceeding said predetermined pressure value.

3. A fuel booster pump adapted to be mounted horizontally and having a base means and a cover means, said base means and said cover means forming a chamber; said base means having an inlet and an outlet and provided with a pumping cavity, said inlet being disposed above said outlet when said pump is horizontally mounted; an impeller disposed within said cavity; a plurality of finger-like extensions formed on said base means and extending into said chamber, a motor assembly disposed within said chamber and having a rotor supported by said finger-like extensions and drivingly connected to said impeller whereby fuel entering said inlet is discharged under pressure out said outlet upon rotation of said impeller by said motor assembly, said rotor having a horizontal axis of rotation when said pump is horizontally mounted; means defining a first passage means in one of said extensions for fluidly interconnecting said inlet with said chamber to provide a supply of fuel within said chamber, the level of said supply of fuel extending to at least the height of said one extension whereby said rotor is submerged in fuel, said first passage means providing said pump with explosive resistance to prevent fire which may occur in said motor assembly from reaching fuel in said inlet; means defining a second passage means in another of said extensions for fluidly interconnecting said outlet with said chamber; a one-way, ball check valve disposed in said second passage means preventing fluid from said outlet from entering said chamber through said second passage means until said fluid reaches a predetermined pressure value to thereby prevent the value of said pressure fluid in said outlet from exceeding said predetermined pressure value.

References Cited in the file of this patent

UNITED STATES PATENTS

| | | |
|---|---|---|
| 1,377,326 | Durnford | May 10, 1921 |
| 1,694,805 | Wiltse | Dec. 11, 1928 |
| 2,026,739 | Johnson | Jan. 7, 1936 |
| 2,139,373 | McKinley et al. | Dec. 6, 1938 |
| 2,301,063 | McConaghy | Nov. 3, 1942 |
| 2,383,369 | Curtis | Aug. 21, 1949 |
| 2,510,632 | Hemphill | June 6, 1950 |
| 2,573,850 | Korte | Nov. 6, 1951 |
| 2,618,322 | Conta et al. | Nov. 18, 1952 |
| 2,652,105 | Tjomsland et al. | Sept. 15, 1953 |

FOREIGN PATENTS

| | | |
|---|---|---|
| 295,985 | Great Britain | Apr. 25, 1929 |
| 565,271 | Great Britain | Nov. 3, 1944 |